United States Patent
Lu (10) Patent No.: US 12,387,406 B2
(45) Date of Patent: Aug. 12, 2025

(54) METHOD AND APPARATUS FOR GENERATING EFFECT VIDEO, ELECTRONIC DEVICE AND STORAGE MEDIUM

(71) Applicant: BEIJING ZITIAO NETWORK TECHNOLOGY CO., LTD., Beijing (CN)

(72) Inventor: Zhixiong Lu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/799,852

(22) Filed: Aug. 9, 2024

(65) Prior Publication Data

US 2024/0404149 A1 Dec. 5, 2024

Related U.S. Application Data

(63) Continuation of application No. PCT/CN2023/074502, filed on Feb. 6, 2023.

(30) Foreign Application Priority Data

Feb. 11, 2022 (CN) .......................... 202210130351.9

(51) Int. Cl.
  *G06T 11/60* (2006.01)
  *G06T 5/50* (2006.01)
  (Continued)

(52) U.S. Cl.
  CPC ................ *G06T 11/60* (2013.01); *G06T 5/50* (2013.01); *G06T 7/20* (2013.01); *G06V 10/25* (2022.01);
  (Continued)

(58) Field of Classification Search
  CPC ............ G06T 11/60; G06T 5/50; G06V 10/25
  See application file for complete search history.

(56) References Cited

U.S. PATENT DOCUMENTS

2008/0088583 A1* 4/2008 Cho ....................... G06F 1/1613
  345/156
2017/0169285 A1 6/2017 Chen et al.
  (Continued)

FOREIGN PATENT DOCUMENTS

CN   104637078 A   5/2015
CN   104780339 A   7/2015
  (Continued)

OTHER PUBLICATIONS

Yang, L., "Analysis and Research on 3D Animation Projects," Thesis, Yangjiang Vocational and Technical College Department of Information Engineering, 2018, 3 pages. (Submitted with English Abstract).
  (Continued)

*Primary Examiner* — Yi Yang
(74) *Attorney, Agent, or Firm* — Alleman Hall & Tuttle LLP (57) ABSTRACT

A method for generating an effect video, an apparatus for generating an effect video, an electronic device, and a storage medium are provided by embodiments of the present disclosure. The method includes: obtaining, in response to detecting that an effect generation condition is met, at least two video frames to be processed which are associated with a current moment; generating a target face dynamic image based on a face image of a target object in the at least two video frames to be processed, and blending the target face dynamic image into a target effect to obtain a target effect image; and determining an effect video frame in a target effect video based on the target effect image and a video
  (Continued)

Obtaining, in response to detecting that an effect generation condition is met, at least two video frames to be processed which are associated with a current moment — S110

Generating a target face dynamic image based on a face image of a target object in the at least two video frames to be processed, and blending the target face dynamic image into a target effect to obtain a target effect image — S120

Determining an effect video frame in a target effect video based on the target effect image and a video frame to be processed which corresponds to the current moment — S130 frame to be processed which corresponds to the current moment.

18 Claims, 3 Drawing Sheets

(51) Int. Cl.
  *G06T 7/20* (2017.01)
  *G06V 10/25* (2022.01)
  *G06V 40/16* (2022.01)

(52) U.S. Cl.
  CPC .. *G06V 40/161* (2022.01); *G06T 2207/20221* (2013.01)

(56) References Cited

U.S. PATENT DOCUMENTS

| | | |
|---|---|---|
| 2018/0027307 A1 | 1/2018 | Ni et al. |
| 2018/0198990 A1* | 7/2018 | Greenberger ........ H04N 5/2621 |
| 2018/0336715 A1* | 11/2018 | Rickwald ............. G06V 40/166 |
| 2019/0213420 A1* | 7/2019 | Karyodisa .............. G06V 20/41 |
| 2020/0272291 A1* | 8/2020 | Wang ..................... G06F 3/0481 |
| 2020/0302179 A1* | 9/2020 | Gao ........................ H04N 21/84 |
| 2020/0371535 A1* | 11/2020 | Li ......................... G06V 10/764 |
| 2020/0380660 A1 | 12/2020 | Yu et al. |
| 2021/0029305 A1 | 1/2021 | Tang et al. |
| 2021/0096726 A1* | 4/2021 | Faulkner .............. G06F 3/04883 |
| 2022/0207667 A1* | 6/2022 | Huang ................. G06V 40/171 |
| 2022/0394343 A1 | 12/2022 | Sun et al. |

FOREIGN PATENT DOCUMENTS

| | | |
|---|---|---|
| CN | 110582020 A | 12/2019 |
| CN | 110738595 A | 1/2020 |
| CN | 111145308 A | 5/2020 |
| CN | 111343073 A | 6/2020 |
| CN | 111754612 A | 10/2020 |
| CN | 111857923 A | 10/2020 |
| CN | 112199016 A | 1/2021 |
| CN | 112422844 A | 2/2021 |
| CN | 112785681 A | 5/2021 |
| CN | 113920167 A | 1/2022 |
| CN | 114531553 A | 5/2022 |
| CN | 114531553 B | 2/2024 |
| WO | 2021139408 A1 | 7/2021 |
| WO | 2021238325 A1 | 12/2021 |
| WO | 2022012182 A1 | 1/2022 |

OTHER PUBLICATIONS

China National Intellectual Property Administration, Notification to Grant Patent Right for Invention Issued in Application No. 202210130351.9, Jan. 16, 2024, 7 pages.
China National Intellectual Property Administration, Office Action Issued in Application No. 202210130351.9, Aug. 29, 2023, 15 pages.
ISA China National Intellectual Property Administration, International Search Report Issued in Application No. PCT/CN2023/074502, May 12, 2023, WIPO, 10 pages.
Communication pursuant to Rules 70(2) and 70a(2) EPC for European Application No. 23752305.5, mailed Apr. 28, 2025, 1 page.
Extended European Search Report for European Application No. 23752305.5, mailed Apr. 7, 2025, 10 pages.

* cited by examiner

METHOD AND APPARATUS FOR GENERATING EFFECT VIDEO, ELECTRONIC DEVICE AND STORAGE MEDIUM

CROSS-REFERENCE TO RELATED APPLICATIONS

This application is a continuation of International Patent Application No. PCT/CN2023/074502, filed on Feb. 6, 2023, which claims the priority to and benefits of the Chinese Patent Application No. 202210130351.9, which was filed on Feb. 11, 2022. All the aforementioned patent applications are hereby incorporated by reference in their entireties.

TECHNICAL FIELD

The present disclosure relates to a field of video processing technology, for example, relates to a method and an apparatus for generating an effect video, an electronic device, and a storage medium.

BACKGROUND

With the development of network technology, more and more applications have entered lives of users, especially a series of software that may film short videos, which are deeply loved by the users.

In related technologies, software developers may add a variety of effect props to the applications for use by the users during the video filming process. However, the effect props provided to the users are very limited, and quality of videos and richness of contents thereof need to be improved. Meanwhile, there is a lack of association between the video content and the selected effect, and the users may have a poor interaction experience when using the effect props.

SUMMARY

The present disclosure provides a method and an apparatus for generating an effect video, an electronic device, and a storage medium, which can not only enhance richness and fun of the obtained effect video content, but also improve the interaction experience of users when using effect props.

In a first aspect, the present disclosure provides a method for generating an effect video, comprising:
  obtaining, in response to detecting that an effect generation condition is met, at least two video frames to be processed which are associated with a current moment;
  generating a target face dynamic image based on a face image of a target object in the at least two video frames to be processed, and blending the target face dynamic image into a target effect to obtain a target effect image; and
  determining an effect video frame in a target effect video based on the target effect image and a video frame to be processed which corresponds to the current moment.

In a second aspect, the present disclosure further provides an apparatus for generating an effect video, comprising:
  a to-be-processed video frame obtaining module, configured to obtain, in response to detecting that an effect generation condition is met, at least two video frames to be processed which are associated with a current moment;
  a target effect image generating module, configured to generate a target face dynamic image based on a face image of a target object in the at least two video frames to be processed, and blend the target face dynamic image into a target effect to obtain a target effect image; and
  an effect video frame determining module, configured to determine an effect video frame in a target effect video based on the target effect image and a video frame to be processed which corresponds to the current moment.

In a third aspect, the present disclosure further provides an electronic device, and the electronic device comprises:
  at least one processor; and
  a storage apparatus, configured to store at least one program; and
  the at least one program, when executed by the at least one processor, causes the at least one processor to implement the method for generating the effect video as described above.

In a fourth aspect, the present disclosure further provides a storage medium comprising computer-executable instructions, and the computer-executable instructions, when executed by a computer processor, are configured to execute the method for generating the effect video as described above.

In a fifth aspect, the present disclosure further provides a computer program product, comprising a computer program carried on a non-transitory computer-readable medium; and the computer program comprises program codes for executing the method for generating the effect video as described above.

DETAILED DESCRIPTION

The embodiments of the present disclosure will be described below with reference to the accompanying drawings. While certain embodiments of the present disclosure are shown in the drawings, the present disclosure may be embodied in various forms and these embodiments are provided for understanding of the present disclosure. The drawings and embodiments of the present disclosure are only for exemplary purposes.

The various steps described in the method implementations of the present disclosure may be performed according to different orders and/or in parallel. Furthermore, the method implementations may include additional steps and/or omit performing the illustrated steps. The scope of the present disclosure is not limited in this aspect.

As used herein, the terms "include," "comprise," and variations thereof are open-ended inclusions, i.e., "including but not limited to." The term "based on" is "based, at least in part, on." The term "an embodiment" represents "at least one embodiment," the term "another embodiment" represents "at least one additional embodiment," and the term "some embodiments" represents "at least some embodiments." Relevant definitions of other terms will be given in the description below.

It should be noted that concepts such as the "first," "second," or the like mentioned in the present disclosure are only used to distinguish different devices, modules or units, and are not used to limit the interdependence relationship or the order of functions performed by these devices, modules or units. The modifications of "a," "an," "a plurality of," and the like mentioned in the present disclosure are illustrative rather than restrictive, and those skilled in the art should understand that unless the context clearly indicates otherwise, these modifications should be understood as "one or more."

The names of messages or information exchanged between multiple devices in the implementations of the present disclosure are only for illustrative purposes, and are not intended to limit the scope of these messages or information.

Before introducing the technical solution of the present disclosure, application scenarios according to the embodiments of the present disclosure may be exemplarily illustrated at first. Exemplarily, when a user films a video through application software or has a video call with other users, the user may want to add some effects to the filmed video, and at the same time, the user may also want to fuse the added effects with some elements in the video, so as to enhance richness and fun of the video content. For example, the user may want to combine the effect with his/her own expression and show the combined effect image in the video. Thus, according to the technical solution of the embodiments of the present disclosure, the effect selected by the user can be automatically fused with an image of user's face in the video, and the fused effect image can be displayed in the video, thereby effectively achieving personalized needs of the user.

Embodiment One

Figure 1:
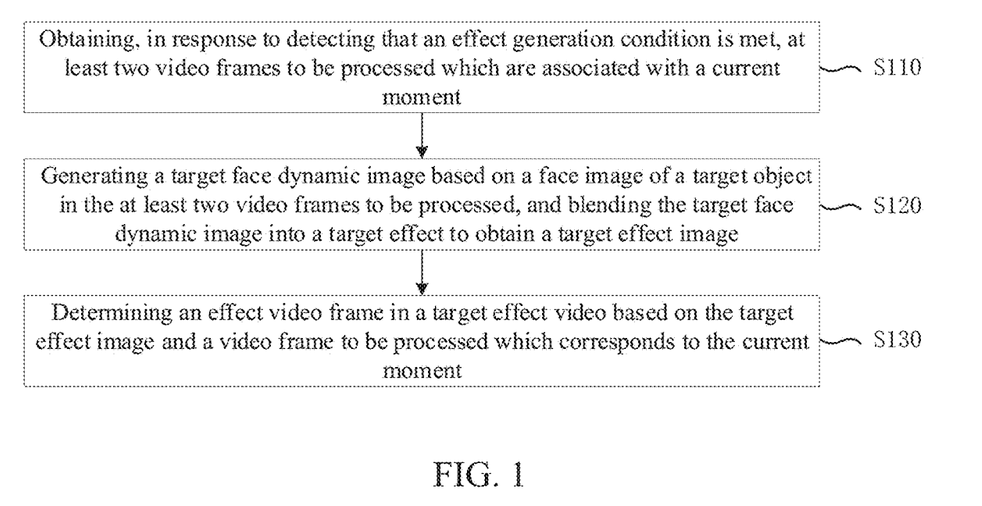
FIG. 1 is a flowchart of a method for generating an effect video provided by Embodiment One of the present disclosure.

FIG. 1 is a flowchart of a method for generating an effect video provided by Embodiment One of the present disclosure. The embodiments of the present disclosure are applicable to the case of fusing an effect selected by a user with an image of user's face in a video and generating an effect video based on the fused effect image and a video frame. The method can be executed by an apparatus for generating an effect video, and the apparatus may be implemented in a form of software and/or hardware or through an electronic device. The electronic device may be a mobile terminal, a personal computer (PC) terminal, a server, or the like.

As illustrated in FIG. 1, the method includes:

S110: obtaining, in response to detecting that an effect generation condition is met, at least two video frames to be processed which are associated with a current moment.

The apparatus for executing the method for generating the effect video provided by the embodiments of the present disclosure may be integrated into application software that supports an effect video processing function, the software may be installed in an electronic device, and the electronic device may be a mobile terminal, a PC terminal, or the like. The application software may be a type of software that processes images/videos, and here will not go into details about the application software, as long as image/video processing can be achieved. The application software may also be a specially developed application in software that can add and show effects, or the application software may also be integrated into a corresponding page, so that the user can process the effect video through the integrated page on the PC terminal.

The technical solution of this embodiment may be executed during a process of the user taking a video, that is, generating an effect video in real time according to an effect prop selected by the user and the captured video, or taking a video uploaded by the user as the raw data basis so as to further generate the effect video based on the solution of this embodiment.

Exemplarily, in the application software or application that supports an effect video processing function, a control for triggering an effect video generating operation may be pre-developed. When the user triggers the control and selects a desired effect in the application, the user may take a video in real time through a camera apparatus on the electronic device, or the user may actively upload an existing video and show the video on a display interface associated with the application. When a video picture is displayed on the display interface, the application may detect the effect generation condition, and may generate the effect video according to the solution of this embodiment when detecting that the condition is met.

In this embodiment, the effect generation condition includes at least one of: detecting that a target object on the display interface meets a first preset condition, or detecting a face region alignment box triggered on the display interface.

The first preset condition includes at least one of: the target object being a preset object, a display proportion of the target object on the display interface reaching a preset display proportion, or a deflection angle of the face image of the target object on the display interface being within a preset threshold range. For example, the target object may be a face image of the user.

Exemplarily, when the first preset condition is the target object being a preset object, the user needs to upload an image including user face information in the application in advance, and after the application recognizes appearance of the user and stores the same with a label, the preset object may be determined. On this basis, when a video picture is displayed on the display interface, the application needs to detect the content therein in real time, and may trigger a subsequent effect video generating operation when detecting that a face image of a user is consistent with the preset object.

When the first preset condition is the display proportion of the target object on the display interface reaching the preset display proportion, the preset display proportion needs to be preset in the application. For example, the display proportion of the face image of the user on the display interface is set to 70%. On this basis, when detecting that a face image of user is greater than or equal to the preset display proportion on the display interface by using a face-based recognition technology, the application may trigger a subsequent effect video generating operation. Such preset condition differs from the previous preset condition in that the detected user is no longer limited to a specific user, but may be any user, in other words, the effect video generating operation will be triggered no matter which user's face image has a display proportion on the display interface that is greater than or equal to the preset display proportion.

When the first preset condition is the deflection angle of the face image of the target object on the display interface being within a preset threshold range, similarly, a user-face deflection angle threshold range needs to be preset in the application. For example, the deflection angle threshold range is set from 0° to 60°. On this basis, when detecting that an included angle between a user face orientation and an opposite direction of a lens is within the preset threshold range on the display interface by using a face-based recognition technology, the application may trigger a subsequent effect video generating operation. The deflection angle threshold range is preset for the user face image to avoid the problem that the application generates a visually poor effect video based on bad data as the user face is not facing the camera.

Figure 2A:
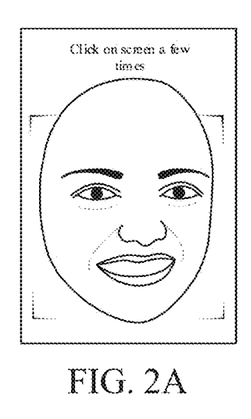
FIGS. 2A-2D are a schematic diagram of steps in an effect video generating process provided by Embodiment One of the present disclosure.

In this embodiment, the case that the face region alignment box corresponds to the face region of the target object may also be taken as an effect generation condition. For example, the face region alignment box may be a rectangular box that is pre-developed in the application and basically adapted to a user face proportion. As shown in FIG. 2A, when the user is taking an effect video, the application may present a rectangular box with special markings at all of four corners on the display interface, and the rectangular box is the face region alignment box. In the practical application process, the box may also guide the user to align the camera apparatus associated with the electronic device with his/her own face region or other user's face region for capturing. Meanwhile, the face region alignment box is generated when detecting that the face image of the target object meets a second preset condition, and the second preset condition includes: the deflection angle of the face image of the target object on the display interface being within the preset threshold range, and relative distance information of the target object on the display interface being less than a preset distance threshold.

While displaying a video picture on the display interface, the face region alignment box may be displayed, so as to guide the user to take a photo of his/her face region or other user's face region. On this basis, when detecting a user face image on the display interface by using a face-based recognition technology, the application not only needs to determine whether the image is located in the face region alignment box, but also needs to determine whether the deflection angle of the user face is within the preset threshold range similar to that in the above-described first preset condition, and the application may trigger a subsequent effect video generating operation only both conditions are met. For example, the effect video generating operation will be triggered, only when the user face is two meters away from the camera apparatus so that corresponding face information is completely within the face region alignment box, and the deflection angle of the user face is generally within a range of 0° to 60° as in the example of the first preset condition.

Those skilled in the art should understand that in the solution of this embodiment, the above-described variety of effect generation conditions may either have any one effect generation condition selected to act on the application alone, or have multiple effect generation conditions selected to act on the application simultaneously, and the embodiments of the present disclosure are not limited in this aspect.

During the process of obtaining at least two video frames to be processed, at least two video frames to be processed which are before the current moment are acquired. Here the video frame to be processed includes the face image of the target object.

When generating the effect video in real time based on the solution of this embodiment, the application may determine a corresponding moment when the user triggers the control for generating the effect video, thereby taking the moment as the current moment. Since the plurality of video frames of the currently captured video all carry corresponding timestamps, at least two video frames including the user face image which are before the moment may be selected as the video frames to be processed with reference to the current moment. When generating the effect video by post-processing the video uploaded by the user based on the solution of this embodiment, the application may similarly determine at least two video frames to be processed among the plurality of video frames in accordance with the above-described manner, and here the embodiments of the present disclosure will not go into details.

Exemplarily, after taking the moment when the user triggers the effect generation control as the current moment, the contents in the plurality of video frames before the moment may be detected frame by frame. When it is detected that one video frame does not include a user face image, a video frame at a previous moment will continue to be detected until a user face image is detected in at least two video frames, so that these video frames may be filtered out as the video frames to be processed. As shown in FIG. 2A, the video frame including the user face image is the video frame to be processed. Those skilled in the art should understand that the number of video frames to be processed may be set according to user needs or actual situations, which will not be limited in the embodiments of the present disclosure.

S120: generating a target face dynamic image based on a face image of a target object in the at least two video frames to be processed, and blending the target face dynamic image into a target effect to obtain a target effect image.

The target face dynamic image may be a dynamic image generated by combining a plurality of static user face images, for example, a graphics interchange format (GIF) animation. The application may extract a plurality of video frames including the user face image according to a certain rule from the plurality of video frames before the video frames to be processed which are at the current moment, and splice the plurality of user face images to obtain the target face dynamic image. In the target face dynamic image, the plurality of face images of the user will be switched at a specified frequency, so as to generate a corresponding dynamic effect. The target effect is a floating effect, and the floating effect takes a two-dimension model and/or a three-dimension model as a carrier. For example, the two-dimension carrier may be a two-dimension (2D) balloon texture pre-imported into the application, and the three-dimension carrier may be a three-dimension (3D) balloon model created in an augmented reality (AR) scenario. The corresponding target effect may be set based on the above-described carrier, and in the finally generated effect video, the balloon texture or the balloon model may be displayed floating in every frame of picture of the effect video.

Figure 2B:
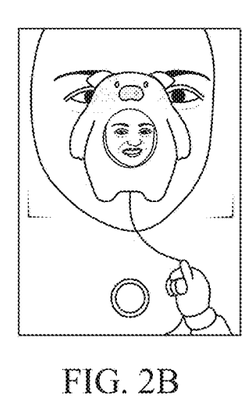

In the practical application process, a plurality of target effects of different styles may be pre-developed. For example, a heart-shaped balloon which has been set with one material attribute is set as one type of target effect. Meanwhile, an animal-shaped balloon which has been set with another material attribute is set as another type of target effect. As shown in FIG. 2B, the target effect may be a cartoon-pig shaped balloon. The thumbnail reflecting the finally-presented visual effect is created and associated for each target effect, and the target effect and the corresponding thumbnail are integrated into the application for choice by the user.

In the practical application process, in addition to the balloon model in the above-described example, the carrier of the floating effect may also be any floatable model, for example, a 3D model of a bird, a 3D model of an aircraft, or the like, which will not be limited in the embodiments of the present disclosure.

In the process of generating the target face dynamic image, at least two video frames to be processed are sequentially taken as an input of a face segmentation model, so as to obtain the face image corresponding to each video frame to be processed, and at least two face images obtained are spliced according to the generation timestamps of the at least two video frames to be processed, so as to generate the target face dynamic image.

The face segmentation model may be a pre-trained neural network model integrated into an application, and is at least used for determining the user face image from the video frame to be processed. The input of the face segmentation model is at least two video frames to be processed which are determined by the application, and the output is the face image extracted from each video frame.

Since each video frame of the video carries a corresponding timestamp, after the face segmentation model outputs a plurality of face images, the plurality of face images may still be spliced together according to the timestamp of the video frame to be processed to which the face image belongs, so as to obtain the target face dynamic image. The target face dynamic image is obtained based on at least two video frames to be processed which are before the current moment. Meanwhile, in the target face dynamic image obtained based on the above-described manner, the user appearance will dynamically change in a more coherent way.

Exemplarily, in 20 video frames to be processed that carry timestamps, the user expression changes continuously, and after inputting the 20 video frames to be processed into the face segmentation model and obtaining the corresponding 20 face images, the 20 face images may be sequentially spliced according to the original timestamp information, so as to obtain the target face dynamic image. The spliced target face dynamic image presents continuously-changing expression of the user, which is completely consistent with the user expression in the 20 video frames to be processed.

In this embodiment, after generating the target face dynamic image, the application may fuse the target face dynamic image with the target effect selected by the user, so as to obtain the target effect image. The target face dynamic image is fused into a central region of the target effect, to obtain the target effect image, so as to loop the target face dynamic image in the central region.

Continuing illustration with the above-described example, when determining the target face dynamic image and determining that the user selects a pink heart-shaped 3D balloon model as the target effect, the application may automatically determine a center point of the 3D balloon model based on a pre-written image center point determination algorithm. By taking the determined center point as a circle center and dividing the balloon model based on a preset radius value, a circle may be obtained as the central region. In the practical application process, the central region may be divided into a variety of shapes on the target effect selected by the user according to actual needs, which will not be limited in the embodiments of the present disclosure.

The target face dynamic image that presents continuous changes in user expressions is fused onto the circular region divided from the balloon model to obtain the target effect image. After fusing the above two, in order to present a better visual effect, the picture in the target face dynamic image will still be cyclically displayed in the central region of the 3D balloon model. As shown in FIG. 2B, after fusing the user face dynamic image into a floating pig balloon, the center of the balloon may cyclically display the face expression of the user. The target face dynamic image may at least present a visual effect of "dynamic emoticons."

S130: determining an effect video frame in a target effect video based on the target effect image and a video frame to be processed which corresponds to the current moment.

In this embodiment, after determining the target effect image, the target effect image may be combined with the video frame to be processed, so as to obtain a plurality of effect video frames in the effect video. The video frame to be processed that is combined with the target effect image is a video frame displayed on the display interface when the user triggers the effect video generating control.

Each video frame of the effect video includes a foreground image and a background image, and the foreground image is displayed superimposed on the background image and may cover the entire region or a portion of region of the background image, thus making the constructed effect video frame more hierarchical. The target effect image is taken as the foreground image in the effect video frame, and the video frame to be processed which corresponds to the current moment is taken as the background image in the effect video frame.

Continuing illustration with the above-described example, when the target effect image in a form of a 3D balloon model including user dynamic expressions is determined, the video frame presented on the display interface when the user triggers the effect generation control may be extracted as the background image. Meanwhile, the target effect image may be displayed superimposed on the background image, so as to obtain the effect video frame used for constructing the effect video. As shown in FIG. 2B, on the effect video frame, a floating cartoon-pig balloon including user dynamic expressions will be displayed on the background image.

Those skilled in the art should understand that when there are a plurality of target effect images, the plurality of target effect images may all be superimposed on the background image obtained based on the video frame to be processed according to the solution of the embodiments of the present disclosure, so as to obtain a plurality of corresponding effect video frames. Here the embodiments of the present disclosure will not go into details.

In the practical application process, after the effect video is obtained, a traction effect may also be added to the target effect image, so as to update the target effect image based on the traction effect. For example, since the target effect is a floating effect, the traction effect may be an animation connected with a floating carrier, such as a cartoon arm dragging a connection line of a balloon.

Continuing illustration with the above-described example, after the effect video frame is obtained, the application may call or draw a cartoon arm for display in a lower right corner of the display interface based on a pre-written program. Meanwhile, a connection line is built up between the arm and the floating 3D balloon. After the arm and the connection line are both drawn, the corresponding traction effect is determined for the current effect video frame, thereby updating the effect video frame. As shown in FIG. 2B, a cartoon arm dragging the balloon will be displayed below the cartoon-pig balloon including the user face expression, and the effect is just the traction effect of the target effect image.

By adding the traction effect to the target effect image, the target effect image with the floating state in the effect video frame is more similar to a real scenario, which reduces a sense of distance between the virtual content on the display interface and the user and enhances fun of the effect video.

The technical solution of the embodiments of the present disclosure involves: obtaining, in response to detecting that an effect generation condition is met, at least two video frames to be processed which are associated with a current moment, that is, obtaining a data foundation for constructing an effect image; generating a target face dynamic image based on a face image of a target object in the at least two video frames to be processed, and blending the target face dynamic image into a target effect to obtain a target effect image; and determining an effect video frame in a target effect video based on the target effect image and a video frame to be processed which corresponds to the current moment. Thus, the added effect is fused with the portion corresponding to the user face in the video in a simple and fast way, which not only avoids the problem of low video quality caused by isolated display of the effect in the video, but also improves richness and fun of the obtained effect video content, and meanwhile improves the interaction experience of the user when using the effect props.

Embodiment Two

Figure 3:
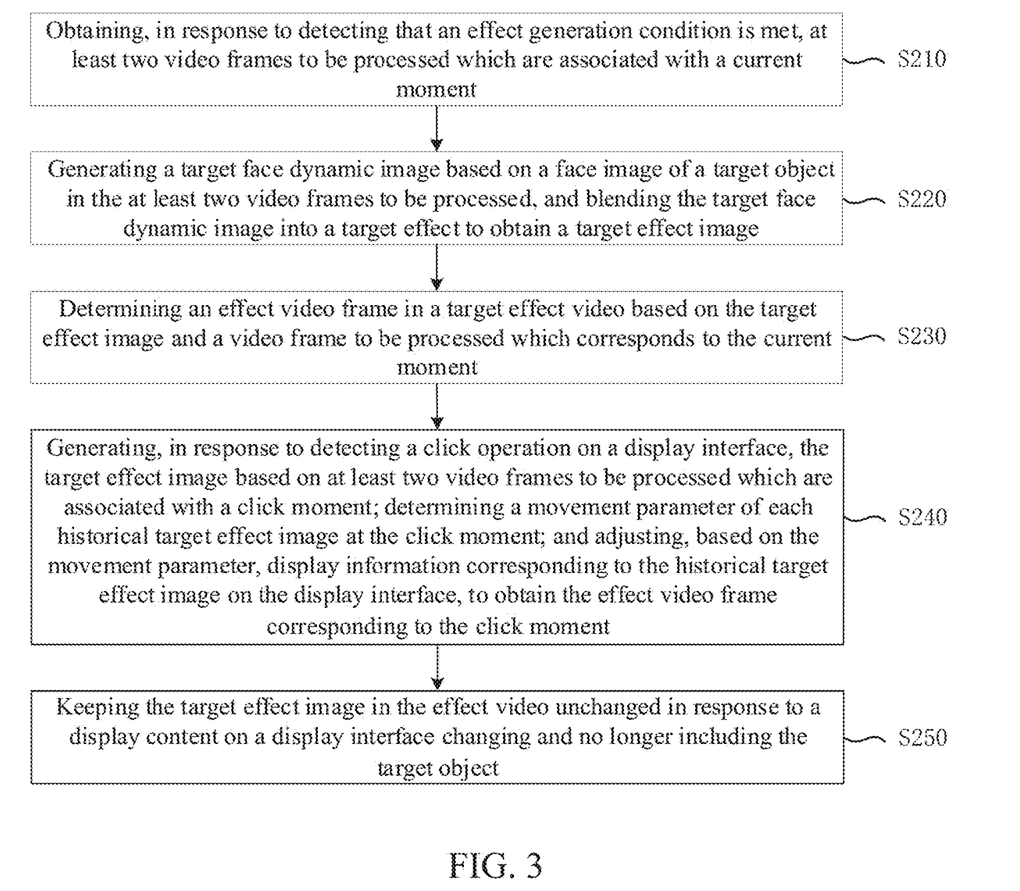
FIG. 3 is a flowchart of a method for generating an effect video provided by Embodiment Two of the present disclosure.

FIG. 3 is a flowchart of a method for generating an effect video provided by Embodiment Two of the present disclosure. On the basis of the foregoing embodiments, when one or more target effect images have already been shown on the display interface, the application may continue to generate a plurality of new target effect images according to a click operation of the user, and at the same time, may also determine a movement parameter of each target effect image, so as to make the same move in a form similar to a "collision" effect in reality. The application keeps displaying the existing target effect image when detecting that the video frame to be processed no longer includes a user face image, and automatically generates a corresponding target effect image when detecting a face image of a new user, thereby improving intelligence of effect video generation. The technical solution of this embodiment may be referred to for implementation. The technical terms which are the same as or corresponding to those in the above-described embodiments will not be repeated here.

As shown in FIG. 3, the method includes following steps.

S210: obtaining, in response to detecting that an effect generation condition is met, at least two video frames to be processed which are associated with a current moment.

S220: generating a target face dynamic image based on a face image of a target object in the at least two video frames to be processed, and blending the target face dynamic image into a target effect to obtain a target effect image.

S230: determining an effect video frame in a target effect video based on the target effect image and a video frame to be processed which corresponds to the current moment.

S240: generating, in response to detecting a click operation on a display interface, the target effect image based on at least two video frames to be processed which are associated with a click moment; determining a movement parameter of each historical target effect image at the click moment; and adjusting, based on the movement parameter, display information corresponding to the historical target effect image on the display interface, to obtain the effect video frame corresponding to the click moment.

Figure 2C:
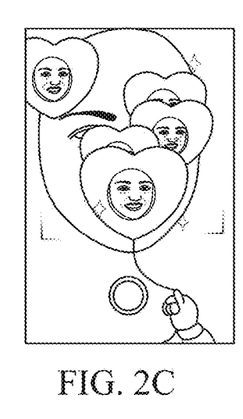

In this embodiment, after showing the generated effect video frame on the display interface, the application may continue to generate a new effect video frame based on a click operation of the user on any region of the display interface. Exemplarily, after a floating 3D balloon including the user's dynamic expression has been displayed on the background image of the effect video frame, the application may determine the click moment corresponding to the click operation of the user in response to detecting the user clicking on any region of the display interface, so that at least two video frames with a timestamp before the click moment may be obtained again as the video frames to be processed, and further the target effect image is re-generated based on the solution of Embodiment One of the present disclosure, that is, the corresponding "dynamic emoticons" will be generated according to the user's new expression, so as to display the new target effect image on the display interface. As shown in FIG. 2C, after the user executes multiple click operations on the display interface, the application may adaptively generate a plurality of floating heart-shaped balloons on the display interface.

In the practical application process, since the target effect is a floating effect with a 2D model or a 3D model as a carrier, in order to make the final visual effect of the effect video more similar to the real effect, it is also necessary to add a corresponding movement parameter for each floating effect when displaying a plurality of floating effects, so that the plurality of effects present a visual effect similar to a "collision" action in reality. For example, the plurality of 3D balloons including user dynamic expressions all present an effect of mutual collision on the display interface, and a picture reflecting the shape and position of each target effect image in each effect video frame is just display information thereof. The process of determining a movement parameter for each target effect image will be described below.

The associated effect image is determined for each historical target effect image according to a center distance between at least one target effect image and a current historical target effect image. The acting force to be synthesized of at least one associated effect image and the current historical target effect image is sequentially determined. The target acting force of the current historical target effect image is determined based on at least one acting force to be synthesized. The movement parameter is determined based on the target acting force and a historical superimposed speed.

The target effect image generated before the click moment is just the historical target effect image. For example, in the above-described example, the floating 3D balloon which has already been displayed on the display interface before the user clicks on any position of the display interface may be determined by the application as the historical target effect image when the user clicks on the display interface. When the user clicks on the screen multiple times, for the new target effect image generated each time, the effect image already displayed before the click operation will be determined as the historical target effect image. For example, when the user clicks on the screen for a second time, a floating 3D balloon is already displayed on the display interface, and thus for the new balloon generated, the 3D balloon already displayed is a historical target effect image; and when the user clicks on the screen for a third time, the two 3D balloons already displayed on the display interface will both be determined as historical target effect images. Here the embodiments of the present disclosure will not go into details.

After generating a new target effect image on the display interface based on the click operation of the user, a center distance between the new target effect image and the historical target effect image needs to be determined, so as to further determine an associated effect image that may cause a "collision" with the new target effect image.

Exemplarily, each target effect image is associated with a corresponding circular bounding box, and each circular bounding box is at least used for reflecting a position of the corresponding target effect image on the display interface and a size of a planar space occupied thereby. When the circular bounding box associated with the new target effect image is determined, a distance between circle centers of the circular bounding box and other circular bounding box may be taken as the center distance according to this embodiment. When the center distance between two circular bounding boxes is smaller than a sum of radii of the two circular bounding boxes, it indicates that the corresponding two target effect images may occur a "collision," and therefore an acting force between these target effect images needs to be determined, and further a movement parameter of the historical target effect image needs to be determined based on the acting force.

In this embodiment, in order to determine the movement parameter of the historical target effect image, a target acting force received thereby needs to be determined firstly. There may be a plurality of target effect images on the display interface simultaneously, and some target effect images may also occur a "collision" with other target effect images simultaneously. Thus, with respect to the target effect image that occurs a "collision" with a plurality of target effect images, the target acting force received thereby is obtained by synthesizing a plurality of acting forces to be synthesized. Therefore, when determining the target acting force, the acting forces to be synthesized between a plurality of target effect images need to be determined firstly.

The acting force to be synthesized of each associated effect image relative to the current historical target effect image is determined according to a center distance between the associated effect image and the current historical target effect image, as well as a preset length value. Here, with respect to any two effect images, the preset length value is a sum of radii of two corresponding circular bounding boxes.

Exemplarily, since the associated effect image will occur a "collision" with the current historical target effect image, the above-described parameter may be calculated according to a pre-written algorithm to determine acting forces to be synthesized between a plurality of balloons "colliding" with each other, when a center distance and a preset length value of at least one floating 3D balloon serving as the associated effect image on the display interface are determined. Finally, with respect to any 3D balloon, the plurality of acting forces to be synthesized are synthesized according to laws of physics, so as to obtain a target acting force acting on the balloon.

After determining the target acting force of the 3D balloon serving as the historical target effect image, some balloons already have a speed at the current moment, that is, a historical superimposed speed. The historical superimposed speed is determined based on an initial speed and a historical target acting force of each historical effect video frame. For example, when a 3D balloon is displayed on the display interface for the first time, the application will generate an initial speed for the balloon based on the preset parameter, and during the process of the user clicking on the screen multiple times to generate a plurality of floating 3D balloons, the balloon will also occur a "collision" so as to be subjected to the historical target acting force.

Therefore, in this embodiment, after the target acting force of the target effect image is determined, the target acting force also needs to be combined with its own historical superimposed speed, so as to determine a final movement parameter of the historical target effect image, that is, to determine a movement direction and a movement speed thereof.

In order to make the target effect image present a more realistic visual effect, and also to prevent too many effect images from being generated as the user clicks on the screen multiple times so as to affect viewing experience of the effect video, in the practical application process, the application also needs to determine a cumulative movement height value according to the movement parameter of each historical target effect image, and remove a historical target effect image whose cumulative movement height value reaches a preset height value from the display interface.

After movement parameters of 3D balloons in multiple movement states on the current display interface are determined, the height of each balloon on the interface also needs to be determined. For example, when it is determined that one balloon is located at the bottom and moves upwards based on its own movement parameter, and another balloon is located in the middle and also moves upwards based on its own movement parameter, the cumulative movement height values of the two balloons on the display interface and also distances by which the balloons float upwards on the display interface also need to be determined. Meanwhile, the application may also take the distance between the top of the display interface and the position of the balloon at the current moment as the corresponding preset height value. On this basis, when the height value of balloon movement reaches the preset height value, it indicates that the balloon has floated to the top of the display interface, and thus the 3D balloon needs to be removed from the display interface.

S250: keeping the target effect image in the effect video unchanged in response to a display content on a display interface changing and no longer including the target object.

In this embodiment, regardless of whether the effect video is generated in real time or obtained through post-processing of an existing video by the application, the content in the video to be processed is constantly changing. Therefore, when generating the effect video, the application still needs to detect the content in each video frame to be processed, and keeps the displayed target effect image unchanged when detecting that the content of the video frame changes and no longer includes the target object.

Figure 2D:
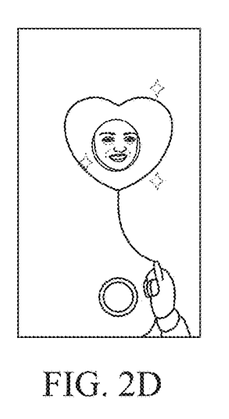

Exemplarily, when the display interface already displays a 3D balloon including user expression and a corresponding traction effect, the content of the video frame to be processed suddenly changes, and a picture after the change no longer includes the user face image. At this time, the display interface will constantly display the 3D balloon associated with the traction effect, and continue to detect the content of each to-be-processed video frame serving as a data foundation of the effect video frame. As shown in FIG. 2D, when the display interface no longer includes the user face image, the balloon effect including the user face expression keeps unchanged in the video picture.

If the target object on the display interface changes, a target effect image is generated based on the face image of the target object after the change, and the historical target effect image is displayed according to the determined movement parameter.

Continuing illustration with the above-described example, when the application keeps the displayed 3D balloon unchanged and constantly detects the content in each video frame to be processed, if a new user face image appears, the application may generate a corresponding target effect image based on the new user face image according to the solution of Embodiment One of the present disclosure, that is, generate a 3D balloon including the new user face expression, thereby displaying the balloon on the display interface. When generating a new 3D balloon, the existing balloon on the display interface will be determined as a historical target effect image, and based on the solution of this embodiment, the application may determine the movement parameters of these balloons, thereby controlling movement of the balloon on the display interface, and at the same time, allowing the newly generated 3D balloon to move only according to an initial speed assigned by the application.

In the technical solution of this embodiment, when one or more target effect images have already been displayed on the display interface, the application may continue to generate a plurality of new target effect images according to the click operation of the user, and at the same time, determine a movement parameter of each target effect image to make the move in a form similar to a "collision" effect in reality. The application keeps displaying the existing target effect image when detecting that the video frame to be processed no longer includes a user face image, and automatically generates a corresponding target effect image when detecting a new user face image, thereby improving intelligence of effect video generation.

Embodiment Three

Figure 4:
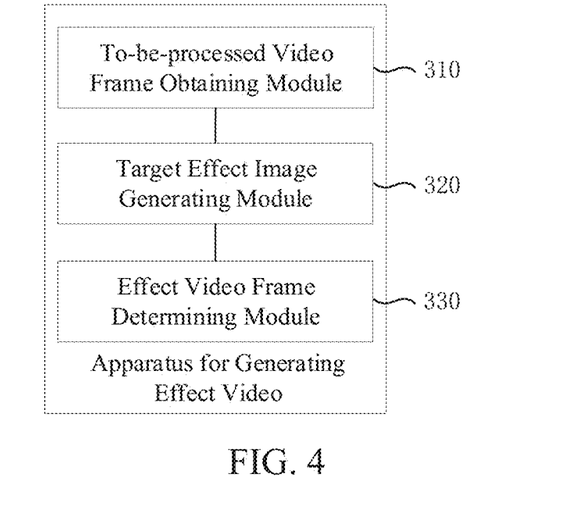
FIG. 4 is a schematic structural diagram of an apparatus for generating an effect video provided by Embodiment Three of the present disclosure.

FIG. 4 is a schematic structural diagram of an apparatus for generating an effect video provided by Embodiment Three of the present disclosure. As illustrated in FIG. 4, the apparatus includes: a to-be-processed video frame obtaining module 310, a target effect image generating module 320, and an effect video frame determining module 330.

The to-be-processed video frame obtaining module 310 is configured to obtain, in response to detecting that an effect generation condition is met, at least two video frames to be processed which are associated with a current moment.

The target effect image generating module 320 is configured to generate a target face dynamic image based on a face image of a target object in the at least two video frames to be processed, and blend the target face dynamic image into a target effect to obtain a target effect image.

The effect video frame determining module 330 is configured to determine an effect video frame in a target effect video based on the target effect image and a video frame to be processed which corresponds to the current moment.

On the basis of the above-described technical solution, the effect generation condition comprises at least one of: detecting that the target object on a display interface meets a first preset condition, wherein the first preset condition comprises at least one of: the target object being a preset object, a display proportion of the target object on the display interface reaching a preset display proportion, or a deflection angle of the face image of the target object on the display interface being within a preset threshold range; or detecting a face region alignment box triggered on the display interface, wherein the face region alignment box corresponds to a face region of the target object.

On the basis of the above-described technical solution, the face region alignment box is generated in response to detecting that the face image of the target object meets a second preset condition; and the second preset condition comprises: the deflection angle of the face image of the target object on the display interface being within the preset threshold range, and relative distance information of the target object on the display interface being less than a preset distance threshold.

The to-be-processed video frame obtaining module 310 is configured to obtain at least two video frames to be processed which are before the current moment, wherein the video frames to be processed which are before the current moment comprise the face image of the target object.

On the basis of the above-described technical solution, the target effect image generating module 320 includes a face image determination unit, a target face dynamic image generation unit, and a target effect image generation unit.

The face image determination unit is configured to sequentially take the at least two video frames to be processed as an input of a face segmentation model, to obtain a face image corresponding to each video frame to be processed.

The target face dynamic image generation unit is configured to splice at least two face images obtained according to a generation timestamp of the at least two video frames to be processed, to generate the target face dynamic image.

On the basis of the above-described technical solution, the target effect is a floating effect, and the floating effect takes at least one of a two-dimension model or a three-dimension model as a carrier.

The target effect image generation unit is configured to blend the target face dynamic image into a central region of the target effect to obtain the target effect image, so as to cyclically display the target face dynamic image in the central region.

The effect video frame determining module 330 is configured to take the target effect image as a foreground image in the effect video frame, and take the video frame to be processed which corresponds to the current moment as a background image in the effect video frame.

On the basis of the above-described technical solution, the apparatus for generating the effect video further includes a traction effect generating module.

The traction effect generating module is configured to add a traction effect to the target effect image so as to update the target effect image based on the traction effect.

On the basis of the above-described technical solution, the apparatus for generating the effect video further includes a detection module.

The detection module is configured to: generate, in response to detecting a click operation on a display interface, the target effect image based on at least two video frames to be processed which are associated with a click moment; determine a movement parameter of each historical target effect image at the click moment, wherein the target effect image generated before the click moment serves as the historical target effect image; and adjust, based on the movement parameter, display information corresponding to the historical target effect image on the display interface, to obtain the effect video frame corresponding to the click moment.

On the basis of the above-described technical solution, the apparatus for generating the effect video further includes a target effect image maintaining module.

The target effect image maintaining module is configured to keep the target effect image in the effect video unchanged in response to a display content on a display interface changing and no longer comprising the target object.

On the basis of the above-described technical solution, the apparatus for generating the effect video further includes a historical target effect image display module.

The historical target effect image display module is configured to generate, in response to a change of the target object on a display interface, the target effect image based on the face image of the target object after the change, and display a historical target effect image according to a determined movement parameter.

The detection module is configured to: determine an associated effect image for each historical target effect image according to a center distance between at least one target effect image and a current historical target effect image; sequentially determine an acting force to be synthesized of at least one associated effect image and the current historical target effect image; determine a target acting force of the current historical target effect image based on at least one acting force to be synthesized; and determine the movement parameter based on the target acting force and a historical superimposed speed, wherein the historical superimposed speed is determined based on an initial speed and a historical target acting force of each historical effect video frame.

The detection module is configured to determine an acting force to be synthesized of each associated effect image with respect to the current historical target effect image according to a preset length value and a center distance between the associated effect image and the current historical target effect image.

On the basis of the above-described technical solution, the apparatus for generating the effect video further includes a historical target effect image removing module.

The historical target effect image removing module is configured to determine a cumulative movement height value according to a movement parameter of each historical target effect image, and remove a historical target effect image whose cumulative movement height value reaches a preset height value from the display interface.

The technical solution provided by this embodiment involves: obtaining, in response to detecting that an effect generation condition is met, at least two video frames to be processed which are associated with a current moment, that is, obtaining a data foundation for constructing an effect image; generating a target face dynamic image based on a face image of a target object in the at least two video frames to be processed, and blending the target face dynamic image into a target effect to obtain a target effect image; and determining an effect video frame in a target effect video based on the target effect image and a video frame to be processed which corresponds to the current moment. Thus, the added effect is fused with the portion corresponding to the user face in the video in a simple and fast way, which not only avoids the problem of low video quality caused by isolated display of the effect in the video, but also improves richness and fun of the obtained effect video content, and meanwhile improves the interaction experience of the user when using the effect props.

The apparatus for generating the effect video provided by the embodiments of the present disclosure may execute the method for generating the effect video provided by any embodiment of the present disclosure, and has corresponding functional modules and effects for executing the method.

The plurality of units and modules included in the above-described apparatus are only divided according to functional logic, but are not limited to the above-described division, as long as the corresponding functions may be implemented. In addition, specific names of the plurality of functional units are only intended to facilitate distinguishing them from each other, and are not used to limit the protection scope of the embodiments of the present disclosure.

Embodiment Four

Figure 5:
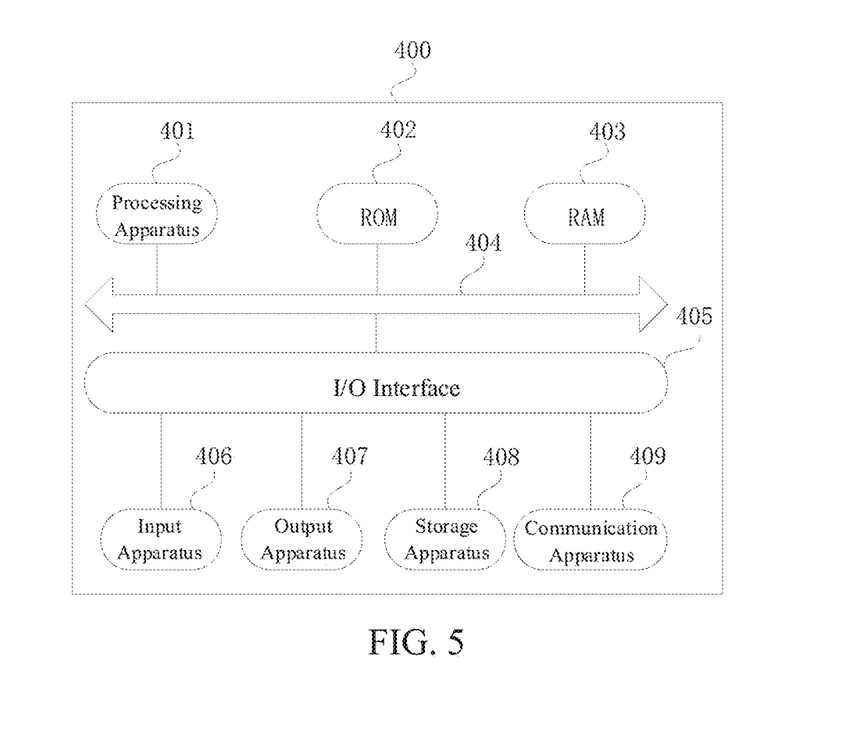
FIG. 5 is a schematic structural diagram of an electronic device provided by Embodiment Four of the present disclosure.

FIG. 5 is a schematic structural diagram of an electronic device provided by Embodiment Four of the present disclosure. Hereinafter, referring to FIG. 5, it shows a schematic structural diagram of an electronic device (e.g., a terminal device or a server in FIG. 5) 400 suitable for implementing the embodiments of the present disclosure. The terminal device in the embodiments of the present disclosure may include, but not limited to, mobile terminals, such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), etc., and fixed terminals, such as a digital television (TV), a desktop computer, etc. The electronic device 400 shown in FIG. 5 is merely an example and should not impose any limitations on the functions and scope of use of the embodiments of the present disclosure.

As illustrated in FIG. 5, the electronic device 400 may include a processing apparatus 401 (e.g., a central processing unit, a graphics processing unit, etc.). The electronic device 400 may execute various appropriate actions and processing according to a program stored on a read-only memory (ROM) 402 or a program loaded from a storage apparatus 408 into a random access memory (RAM) 403. The RAM 403 further stores various programs and data required for operation of the electronic device 400. The processing apparatus 401, the ROM 402, and the RAM 403 are connected with each other through a bus 404. An input/output (I/O) interface 405 is also connected to the bus 404.

Usually, apparatuses below may be connected to the I/O interface 405: an input apparatus 406 including, for example, a touch screen, a touch pad, a keyboard, a mouse, a camera, a microphone, an accelerometer, a gyroscope, or the like; an output apparatus 407 including, for example, a liquid crystal display (LCD), a speaker, a vibrator, or the like; a storage apparatus 408 including, for example, a magnetic tape, a hard disk, or the like; and a communication apparatus 409. The communication apparatus 409 may allow the electronic device 400 to perform wireless or wired communication with other electronic devices so as to exchange data. Although FIG. 5 shows the electronic device 400 having various apparatuses, it is not required to implement or have all the apparatuses illustrated, and the electronic device may alternatively implement or have more or fewer apparatuses.

According to the embodiments of the present disclosure, the process described above with reference to the flowchart may be implemented as computer software programs. For example, the embodiments of the present disclosure include a computer program product, including a computer program carried on a non-transitory computer-readable medium, and the computer program includes program codes for executing the method shown in the flowchart. In such embodiments, the computer program may be downloaded and installed from the network via the communication apparatus 409, or installed from the storage apparatus 408, or installed from the ROM 402. When executed by the processing apparatus 401, the computer program may implement the above functions defined in the method provided by the embodiments of the present disclosure.

The names of messages or information exchanged between multiple apparatuses in the implementations of the present disclosure are only for illustrative purposes, and are not intended to limit the scope of these messages or information.

The electronic device provided by the embodiments of the present disclosure belongs to the same disclosed concept as the method for generating the effect video provided by the above-described embodiments. The technical details which are not described in detail in this embodiment may refer to the above-described embodiments, and this embodiment has the same advantageous effects as the above-described embodiments.

Embodiment Five

The embodiments of the present disclosure provide a computer storage medium, a computer program is stored on the computer storage medium, and the program, when executed by a processor, is configured to implement the method for generating the effect video provided by the above-described embodiments.

The computer-readable medium described in the present disclosure may be a computer-readable signal medium or a computer-readable storage medium, or any combination thereof. The computer-readable storage medium may be, but not limited to, an electric, magnetic, optical, electromagnetic, infrared, or semiconductor system, apparatus or device, or any combination thereof. For example, the computer-readable storage medium may include, but not limited to, an electrical connection with one or more wires, a portable computer disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to, an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program codes contained on the computer-readable medium may be transmitted by using any suitable medium, including but not limited to, an electric wire, a fiber-optic cable, radio frequency (RF) and the like, or any appropriate combination of them.

In some implementations, the client and the server may communicate with any network protocol currently known or to be researched and developed in the future such as hypertext transfer protocol (HTTP), and may communicate (for example, via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-described computer-readable medium may be included in the above-described electronic device, or may also exist alone without being assembled into the electronic device.

The above-mentioned computer-readable medium carries one or more programs, and the one or more programs, when executed by the electronic device, cause the electronic device to:

obtain, in response to detecting that an effect generation condition is met, at least two video frames to be processed which are associated with a current moment; generate a target face dynamic image based on a face image of a target object in the at least two video frames to be processed, and blend the target face dynamic image into a target effect to obtain a target effect image; and determine an effect video frame in a target effect video based on the target effect image and a video frame to be processed which corresponds to the current moment.

The computer program codes for performing the operations of the present disclosure may be written in one or more programming languages or a combination thereof. The above-described programming languages include but are not limited to object-oriented programming languages, such as Java, Smalltalk, C++, and also include conventional procedural programming languages, such as the "C" programming language or similar programming languages. The program codes may by executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flow chart and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The units involved in the embodiments of the present disclosure may be implemented in software or hardware. Here the name of the unit does not constitute a limitation of the unit itself under certain circumstances. For example, the first acquiring unit may also be described as "a unit that acquires at least two Internet protocol addresses."

The functions described herein above may be performed, at least partially, by one or more hardware logic components. For example, without limitation, available exemplary types of hardware logic components include: a field programmable gate array (FPGA), an application specific integrated circuit (ASIC), application specific standard parts (ASSP), a system on chip (SOC), a complex programmable logical device (CPLD), etc.

In the context of the present disclosure, the machine-readable medium may be a tangible medium containing or storing a program that can be used by or in combination with an instruction execution system, apparatus or device. The machine-readable medium may be a machine-readable signal medium or a machine-readable storage medium. The machine-readable medium may include, but not limited to, an electric, magnetic, optical, electromagnetic, infrared, or semiconductor system, apparatus or device, or any appropriate combination thereof. Examples of the machine-readable storage medium may include: an electrical connection based on one or more wires, a portable computer disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them.

According to one or more embodiments of the present disclosure, Example 1 provides a method for generating an effect video, and the method includes:

obtaining, in response to detecting that an effect generation condition is met, at least two video frames to be processed which are associated with a current moment;

generating a target face dynamic image based on a face image of a target object in the at least two video frames to be processed, and blending the target face dynamic image into a target effect to obtain a target effect image; and determining an effect video frame in a target effect video based on the target effect image and a video frame to be processed which corresponds to the current moment.

According to one or more embodiments of the present disclosure, in the method for generating the effect video provided by Example 2:

the effect generation condition comprises at least one of:

detecting that the target object on a display interface meets a first preset condition, wherein the first preset condition comprises at least one of: the target object being a preset object, a display proportion of the target object on the display interface reaching a preset display proportion, or a deflection angle of the face image of the target object on the display interface being within a preset threshold range; or detecting a face region alignment box triggered on the display interface, wherein the face region alignment box corresponds to a face region of the target object.

According to one or more embodiments of the present disclosure, in the method for generating the effect video provided by Example 3:

the face region alignment box is generated in response to detecting that the face image of the target object meets a second preset condition; and the second preset condition comprises: the deflection angle of the face image of the target object on the display interface being within the preset threshold range, and relative distance information of the target object on the display interface being less than a preset distance threshold.

According to one or more embodiments of the present disclosure, the method for generating the effect video provided by Example 4 further includes:

obtaining at least two video frames to be processed which are before the current moment, wherein the video frames to be processed which are before the current moment comprise the face image of the target object.

According to one or more embodiments of the present disclosure, the method for generating the effect video provided by Example 5 further includes:

sequentially taking the at least two video frames to be processed as an input of a face segmentation model, to obtain a face image corresponding to each video frame to be processed; and splicing at least two face images obtained according to a generation timestamp of the at least two video frames to be processed, to generate the target face dynamic image.

According to one or more embodiments of the present disclosure, in the method for generating the effect video provided by Example 6:

the target effect is a floating effect, and the floating effect takes at least one of a two-dimension model or a three-dimension model as a carrier.

According to one or more embodiments of the present disclosure, the method for generating the effect video provided by Example 7 further includes:

blending the target face dynamic image into a central region of the target effect to obtain the target effect image, so as to cyclically display the target face dynamic image in the central region.

According to one or more embodiments of the present disclosure, the method for generating the effect video provided by Example 8 further includes:

taking the target effect image as a foreground image in the effect video frame, and taking the video frame to be processed which corresponds to the current moment as a background image in the effect video frame.

According to one or more embodiments of the present disclosure, the method for generating the effect video provided by Example 9 further includes:

adding a traction effect to the target effect image so as to update the target effect image based on the traction effect.

According to one or more embodiments of the present disclosure, the method for generating the effect video provided by Example 10 further includes:

generating, in response to detecting a click operation on a display interface, the target effect image based on at least two video frames to be processed which are associated with a click moment;

determining a movement parameter of each historical target effect image at the click moment, wherein the target effect image generated before the click moment serves as the historical target effect image; and adjusting, based on the movement parameter, display information corresponding to the historical target effect image on the display interface, to obtain the effect video frame corresponding to the click moment.

According to one or more embodiments of the present disclosure, the method for generating the effect video provided by Example 11 further includes:

keeping the target effect image in the effect video unchanged in response to a display content on a display interface changing and no longer comprising the target object.

According to one or more embodiments of the present disclosure, the method for generating the effect video provided by Example 12 further includes:

generating, in response to a change of the target object on a display interface, the target effect image based on the face image of the target object after the change; and displaying a historical target effect image according to a determined movement parameter.

According to one or more embodiments of the present disclosure, the method for generating the effect video provided by Example 13 further includes:

determining an associated effect image for each historical target effect image according to a center distance between at least one target effect image and a current historical target effect image;

sequentially determining an acting force to be synthesized of at least one associated effect image and the current historical target effect image;

determining a target acting force of the current historical target effect image based on at least one acting force to be synthesized; and determining the movement parameter based on the target acting force and a historical superimposed speed, wherein the historical superimposed speed is determined based on an initial speed and a historical target acting force of each historical effect video frame.

According to one or more embodiments of the present disclosure, the method for generating the effect video provided by Example 14 further includes:

determining an acting force to be synthesized of each associated effect image with respect to the current historical target effect image according to a preset length value and a center distance between the associated effect image and the current historical target effect image.

According to one or more embodiments of the present disclosure, the method for generating the effect video provided by Example 15 further includes:

determining a cumulative movement height value according to a movement parameter of each historical target effect image; and removing a historical target effect image whose cumulative movement height value reaches a preset height value from the display interface.

According to one or more embodiments of the present disclosure, Example 16 provides an apparatus for generating an effect video, and the apparatus includes:

a to-be-processed video frame obtaining module, configured to obtain, in response to detecting that an effect generation condition is met, at least two video frames to be processed which are associated with a current moment;

a target effect image generating module, configured to generate a target face dynamic image based on a face image of a target object in the at least two video frames to be processed, and blend the target face dynamic image into a target effect to obtain a target effect image; and an effect video frame determining module, configured to determine an effect video frame in a target effect video based on the target effect image and a video frame to be processed which corresponds to the current moment.

In addition, although the plurality of operations are described in a particular order, this should not be understood as requiring the operations to be executed in the particular order shown or in a sequential order. Under certain circumstances, multitasking and parallel processing may be favorable. Similarly, although the above discussion includes a number of specific implementation details, these should not be interpreted as limiting the scope of the present disclosure. Certain features as described in the context of separate embodiments may also be implemented in a single embodiment in combination. Conversely, various features as described in the context of a single embodiment may also be implemented in a plurality of embodiments individually or in any suitable sub-combination.

The invention claimed is:

1. A method for generating an effect video, comprising:

obtaining, in response to detecting that an effect generation condition is met, at least two video frames to be processed which are associated with a current moment;

generating a target face dynamic image based on a face image of a target object in the at least two video frames to be processed, and blending the target face dynamic image into a target effect to obtain a first effect image; and determining an effect video frame in a target effect video based on the first effect image and a video frame to be processed which corresponds to the current moment, wherein, after determining the effect video frame in the target effect video, the method further comprises:

generating, in response to detecting a click operation on a display interface, a second effect image based on at least two video frames to be processed which are associated with a click moment;

determining a movement parameter of each historical effect image at the click moment, wherein an effect image generated before the click moment serves as the historical effect image; and adjusting, based on the movement parameter, display information corresponding to the historical effect image on the display interface, to obtain the effect video frame corresponding to the click moment, wherein determining the movement parameter of each historical effect image at the click moment comprises:

determining an associated effect image for each historical effect image according to a center distance between at least one effect image and a current historical effect image;

sequentially determining an acting force to be synthesized of at least one associated effect image and the current historical effect image;

determining a target acting force of the current historical effect image based on at least one acting force to be synthesized; and determining the movement parameter based on the target acting force and a historical superimposed speed, and wherein the historical superimposed speed is determined based on an initial speed and a historical target acting force of each historical effect video frame.

2. The method according to claim 1, wherein the effect generation condition comprises at least one of:

detecting that the target object on the display interface meets a first preset condition, wherein the first preset condition comprises at least one of: the target object being a preset object, a display proportion of the target object on the display interface reaching a preset display proportion, or a deflection angle of the face image of the target object on the display interface being within a preset threshold range; or detecting a face region alignment box triggered on the display interface, wherein the face region alignment box corresponds to a face region of the target object.

3. The method according to claim 2, wherein the face region alignment box is generated in response to detecting that the face image of the target object meets a second preset condition; and the second preset condition comprises: the deflection angle of the face image of the target object on the display interface being within the preset threshold range, and relative distance information of the target object on the display interface being less than a preset distance threshold.

4. The method according to claim 1, wherein obtaining the at least two video frames to be processed which are associated with the current moment comprises:

obtaining at least two video frames to be processed which are before the current moment, wherein the video frames to be processed which are before the current moment comprise the face image of the target object.

5. The method according to claim 1, wherein generating the target face dynamic image based on the face image of the target object in the at least two video frames to be processed comprises:

sequentially taking the at least two video frames to be processed as an input of a face segmentation model, to obtain a face image corresponding to each video frame to be processed; and splicing at least two face images obtained according to a generation timestamp of the at least two video frames to be processed, to generate the target face dynamic image.

6. The method according to claim 1, wherein the target effect is a floating effect, and the floating effect takes at least one of a two-dimension model or a three-dimension model as a carrier.

7. The method according to claim 6, wherein blending the target face dynamic image into the target effect to obtain the first effect image comprises:

blending the target face dynamic image into a central region of the target effect to obtain the first effect image, so as to cyclically display the target face dynamic image in the central region.

8. The method according to claim 1, wherein determining the effect video frame in the target effect video based on the first effect image and the video frame to be processed which corresponds to the current moment comprises:

taking the first effect image as a foreground image in the effect video frame, and taking the video frame to be processed which corresponds to the current moment as a background image in the effect video frame.

9. The method according to claim 1, further comprising:
adding a traction effect to the first effect image so as to update the first effect image based on the traction effect.

10. The method according to claim 1, wherein sequentially determining the acting force to be synthesized of the at least one associated effect image and the current historical effect image comprises:

determining an acting force to be synthesized of each associated effect image with respect to the current historical effect image according to a preset length value and a center distance between the associated effect image and the current historical effect image.

11. The method according to claim 1, further comprising:
determining a cumulative movement height value according to the movement parameter of each historical effect image; and removing a historical effect image whose cumulative movement height value reaches a preset height value from the display interface.

12. The method according to claim 1, wherein after the effect video frame is obtained, the method further comprises:

keeping the first effect image in the effect video unchanged in response to a display content on a display interface changing and no longer comprising the target object.

13. The method according to claim 1, further comprising:
generating, in response to a change of the target object on a display interface, a third effect image based on the face image of the target object after the change; and displaying a historical effect image according to a determined movement parameter.

14. An electronic device, comprising:
at least one processor; and
a storage apparatus configured to store at least one program which, when executed by the at least one processor, causes the at least one processor to:

obtain, in response to detecting that an effect generation condition is met, at least two video frames to be processed which are associated with a current moment;

generate a target face dynamic image based on a face image of a target object in the at least two video frames to be processed, and blend the target face dynamic image into a target effect to obtain a first effect image; and determine an effect video frame in a target effect video based on the first effect image and a video frame to be processed which corresponds to the current moment, wherein, after the determine an effect video frame in a target effect video, the at least one program further causes the at least one processor to:

generate, in response to detecting a click operation on a display interface, a second effect image based on at least two video frames to be processed which are associated with a click moment;

determine a movement parameter of each historical effect image at the click moment, wherein an effect image generated before the click moment serves as the historical effect image; and adjust, based on the movement parameter, display information corresponding to the historical effect image on the display interface, to obtain the effect video frame corresponding to the click moment, wherein the determine the movement parameter of each historical effect image at the click moment, comprises:

determining an associated effect image for each historical effect image according to a center distance between at least one effect image and a current historical effect image;

sequentially determining an acting force to be synthesized of at least one associated effect image and the current historical effect image;

determining a target acting force of the current historical effect image based on at least one acting force to be synthesized; and determining the movement parameter based on the target acting force and a historical superimposed speed, and wherein the historical superimposed speed is determined based on an initial speed and a historical target acting force of each historical effect video frame.

15. The electronic device according to claim 14, wherein the effect generation condition comprises at least one of:
   detecting that the target object on the display interface meets a first preset condition, wherein the first preset condition comprises at least one of: the target object being a preset object, a display proportion of the target object on the display interface reaching a preset display proportion, or a deflection angle of the face image of the target object on the display interface being within a preset threshold range; or
   detecting a face region alignment box triggered on the display interface, wherein the face region alignment box corresponds to a face region of the target object.

16. The electronic device according to claim 15, wherein the face region alignment box is generated in response to detecting that the face image of the target object meets a second preset condition; and
   the second preset condition comprises: the deflection angle of the face image of the target object on the display interface being within the preset threshold range, and relative distance information of the target object on the display interface being less than a preset distance threshold.

17. The electronic device according to claim 14, wherein obtaining the at least two video frames to be processed which are associated with the current moment comprises:
   obtaining at least two video frames to be processed which are before the current moment,
   wherein the video frames to be processed which are before the current moment comprise the face image of the target object.

18. A non-transitory storage medium comprising computer-executable instructions, wherein the computer-executable instructions, when executed by a computer processor, are configured to:
   obtain, in response to detecting that an effect generation condition is met, at least two video frames to be processed which are associated with a current moment;
   generate a target face dynamic image based on a face image of a target object in the at least two video frames to be processed, and blend the target face dynamic image into a target effect to obtain a first effect image; and
   determine an effect video frame in a target effect video based on the first effect image and a video frame to be processed which corresponds to the current moment;
   wherein, after the determine the effect video frame in the target effect video, the computer-executable instructions are further configured to:
      generate, in response to detecting a click operation on a display interface, a second effect image based on at least two video frames to be processed which are associated with a click moment;
      determine a movement parameter of each historical effect image at the click moment, wherein an effect image generated before the click moment serves as the historical effect image; and
      adjust, based on the movement parameter, display information corresponding to the historical effect image on the display interface, to obtain the effect video frame corresponding to the click moment,
   wherein the determine the movement parameter of each historical effect image at the click moment, comprises:
      determining an associated effect image for each historical effect image according to a center distance between at least one effect image and a current historical effect image;
      sequentially determining an acting force to be synthesized of at least one associated effect image and the current historical effect image;
      determining a target acting force of the current historical effect image based on at least one acting force to be synthesized; and
      determining the movement parameter based on the target acting force and a historical superimposed speed, and
   wherein the historical superimposed speed is determined based on an initial speed and a historical target acting force of each historical effect video frame.

* * * * *